(12) United States Patent
Thorley et al.

(10) Patent No.: US 9,347,760 B2
(45) Date of Patent: May 24, 2016

(54) COMBINATION GAUGE TOOL

(71) Applicant: Bosch Automotive Service Solutions LLC, Warren, MI (US)

(72) Inventors: Simon M. Thorley, South Lyon, MI (US); Darren Schumacher, Ann Arbor, MI (US); Denny Hanson, Medford, MN (US); Manokar Chinnadurai, Owatonna, MN (US); Fred Kaleal, Gross Pointe Woods, MI (US); William Wittliff, III, Gobles, MI (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 73 days.

(21) Appl. No.: 14/212,065

(22) Filed: Mar. 14, 2014

(65) Prior Publication Data

US 2014/0259719 A1 Sep. 18, 2014

Related U.S. Application Data

(60) Provisional application No. 61/787,563, filed on Mar. 15, 2013.

(51) Int. Cl.
*G01B 5/06* (2006.01)
*G01B 5/18* (2006.01)
*G01B 5/00* (2006.01)
*G01B 3/20* (2006.01)

(52) U.S. Cl.
CPC .............. *G01B 5/0028* (2013.01); *G01B 3/205* (2013.01); *G01B 5/18* (2013.01)

(58) Field of Classification Search
CPC ............................. G01B 3/205; G01B 5/0028

USPC .................. 33/1 BB, 203, 600, 609, 610, 836
See application file for complete search history.

(56) References Cited

U.S. PATENT DOCUMENTS

| | | | |
|---|---|---|---|
| 3,905,239 A | 9/1975 | Legille | |
| 4,894,920 A * | 1/1990 | Butler et al. | 33/836 |
| 5,789,661 A | 8/1998 | Fauque et al. | |
| 6,931,744 B1* | 8/2005 | Ikerd et al. | 33/609 |
| 2002/0036039 A1* | 3/2002 | Shimura | 152/154.2 |
| 2003/0187556 A1* | 10/2003 | Suzuki | 701/29 |
| 2005/0274175 A1* | 12/2005 | Graham et al. | 73/121 |
| 2009/0229357 A1* | 9/2009 | Kitchen | 73/121 |
| 2013/0083188 A1* | 4/2013 | Mian et al. | 348/135 |
| 2014/0150274 A1* | 6/2014 | Emtman et al. | 33/810 |

FOREIGN PATENT DOCUMENTS

| CN | 102183454 A | 9/2011 |
|---|---|---|
| CN | 201983985 U | 9/2011 |
| CN | 101809210 B | 6/2012 |

OTHER PUBLICATIONS

Notification of Transmittal of the International Search Report and the Written Opinion of the International Searching Authority, or the Declaration mailed Jul. 25, 2014.

* cited by examiner

*Primary Examiner* — G. Bradley Bennett
(74) *Attorney, Agent, or Firm* — Baker & Hostetler LLP

(57) ABSTRACT

A combination gauge tool and a method of measuring are provided. The combination gauge tool includes a processing module having a sensor. The combination gauge tool includes at least two of a brake pad thickness gauge, a tire treads depth gauge, and a rotor thickness gauge each coupled to the processing module at one or more inputs of the sensor and configured to provide measurement data to the sensor.

20 Claims, 3 Drawing Sheets

COMBINATION GAUGE TOOL

CROSS-REFERENCE TO RELATED APPLICATIONS

This application claims priority to U.S. patent application entitled, COMBINATION GAUGE TOOL, filed Mar. 15, 2013, having a Ser. No. 61/787,563, the disclosure of which is hereby incorporated by reference in its entirety.

FIELD OF THE DISCLOSURE

The present disclosure relates generally to diagnostic equipment and a method. More particularly, the present disclosure relates to a combination gauge tool.

BACKGROUND

Conventionally, brake pad thickness measurement gauges, rotor thickness gauges, and tire treads depth gauges are available as separate gauge tools. In a typical use case scenario, a technician diagnosing a brake pad, a tire treads depth, and a rotor thickness has to use these separate tools to measure these aforementioned parameters. Further, the technician may have to remove the wheels from a vehicle to perform one or more of such measurements. Unfortunately, such conventional tools increase the cost of diagnosis and are time consuming since they involve multiple steps.

Furthermore, in conventional gauge tools, the measured parameters are typically indicated on a mechanical ruler or a scale. The technician has to note down the measurements on a notebook, or verbally communicate the measurements to an assistant, both of which activities are cumbersome, error-prone, and unwieldy. Accordingly, a need exists for a gauge tool that is easier to use that can perform accurate measurements in lesser time than conventional separate gauge tools.

SUMMARY

According to one embodiment, a combination gauge tool is provided. The combination gauge tool includes a processing module having a pressure sensor and a displacement sensor; and at least two of a brake pad thickness gauge, a tire treads depth gauge, and a rotor thickness gauge, each of the two being coupled to the processing module at one or more inputs and configured to provide a measurement data to either the pressure sensor or the displacement sensor.

According to another embodiment, a method of measuring that includes selecting a measurement tool from one of one of a brake pad thickness gauge, a tire treads depth gauge, and a rotor thickness gauge using a mode selection switch of the combination gauge tool, measuring a measurement value using the selected measurement tool coupled to a component of a vehicle, determining the measurement value with a pressure sensor or a displacement sensor that is coupled to the selected measurement tool, and digitally displaying the measurement value on an electronic display of the combination gauge tool.

According to still another embodiment, a combination gauge tool is provided. The combination gauge tool includes a brake pad thickness gauge coupled to at least one of a pressure sensor or a displacement sensor, a tire treads depth gauge coupled to at least one of the pressure sensor or the displacement sensor, a rotor thickness gauge coupled to at least one of the pressure sensor or the displacement sensor, a microprocessor configured to digitally process respective signals outputted by the pressure sensor or the displacement sensor, and a digital display coupled to the microprocessor to electronically display a measured value corresponding to the respective processed signals.

There has thus been outlined, rather broadly, certain embodiments in order that the detailed description thereof herein may be better understood, and in order that the present contribution to the conventional art may be better appreciated. There are, of course, additional embodiments of the disclosure that will be described below, which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, apparatii, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

Figure 1:
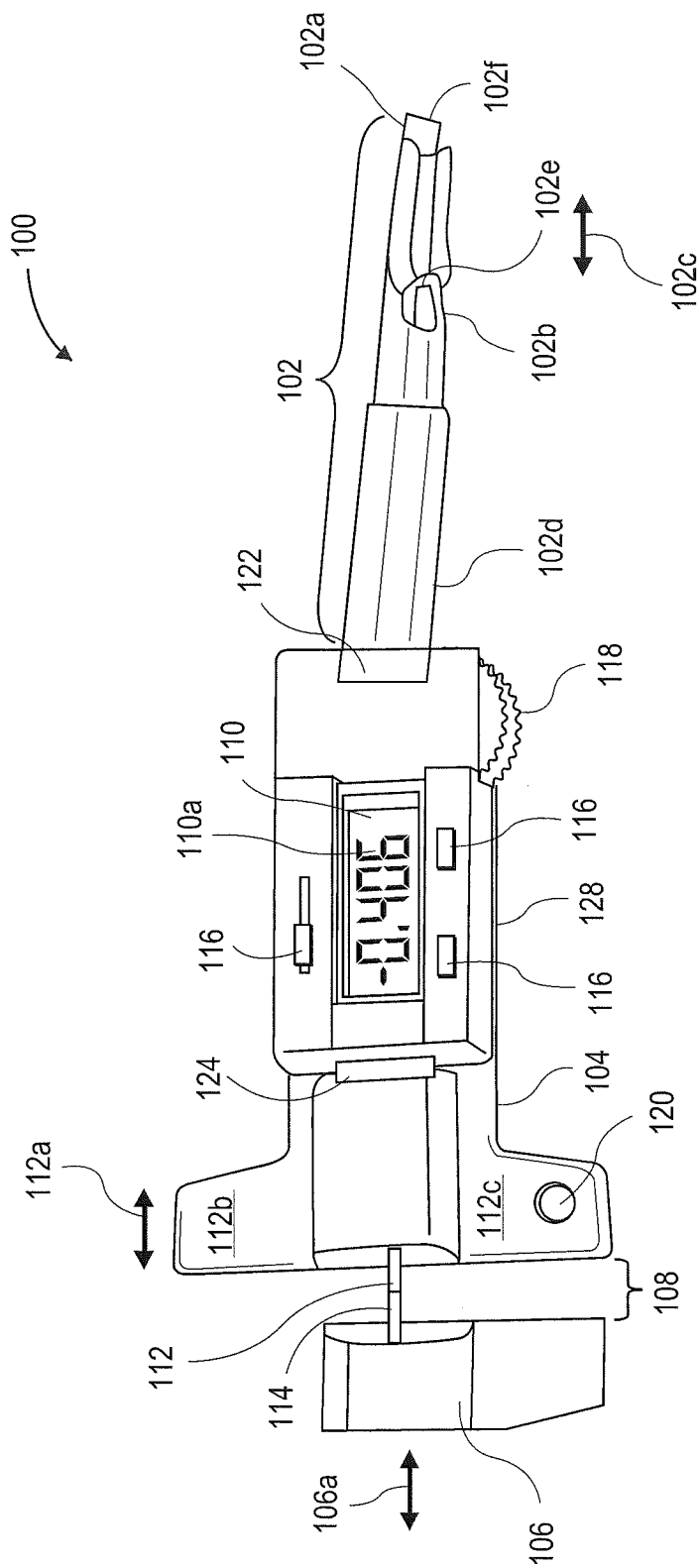
FIG. 1 illustrates a combination gauge tool, in accordance with an embodiment of the present disclosure.

Referring to FIG. 1, a combination gauge tool 100 is illustrated. The combination gauge tool 100 may include at least a brake pad thickness gauge 102, a tire treads depth gauge 104, a rotor thickness gauge 106, and a processing module 128. In one embodiment, the combination gauge tool 100 may include two or more of the brake pad thickness gauge 102, the tire treads depth gauge 104, and the rotor thickness gauge 106 in various combinations. For example, in one embodiment, the combination gauge tool 100 may comprise only the brake pad thickness gauge 102 and the tire treads depth gauge 104. Likewise, in another embodiment, the combination gauge tool 100 may comprise only the brake pad thickness gauge 102 and the rotor thickness gauge 106. In yet another embodiment, the combination gauge tool 100 may comprise only the rotor thickness gauge 106 and the tire treads depth gauge 104. In one embodiment, the brake pad thickness gauge 102 and/or the rotor thickness gauge 106 may be removable or detachable from, or removeably attachable to, the combination gauge tool 100. In this respect, the term "combination" as used in the combination gauge tool 100 may relate to one or more combinations of two or more of the brake pad thickness gauge 102, the tire treads depth gauge 104, and the rotor thickness gauge 106. Alternative phrases or terms such as "integrated", "all-in-one", "combined", and the like may be used instead of the term "combination" to describe the combination gauge tool 100.

Figure 2:
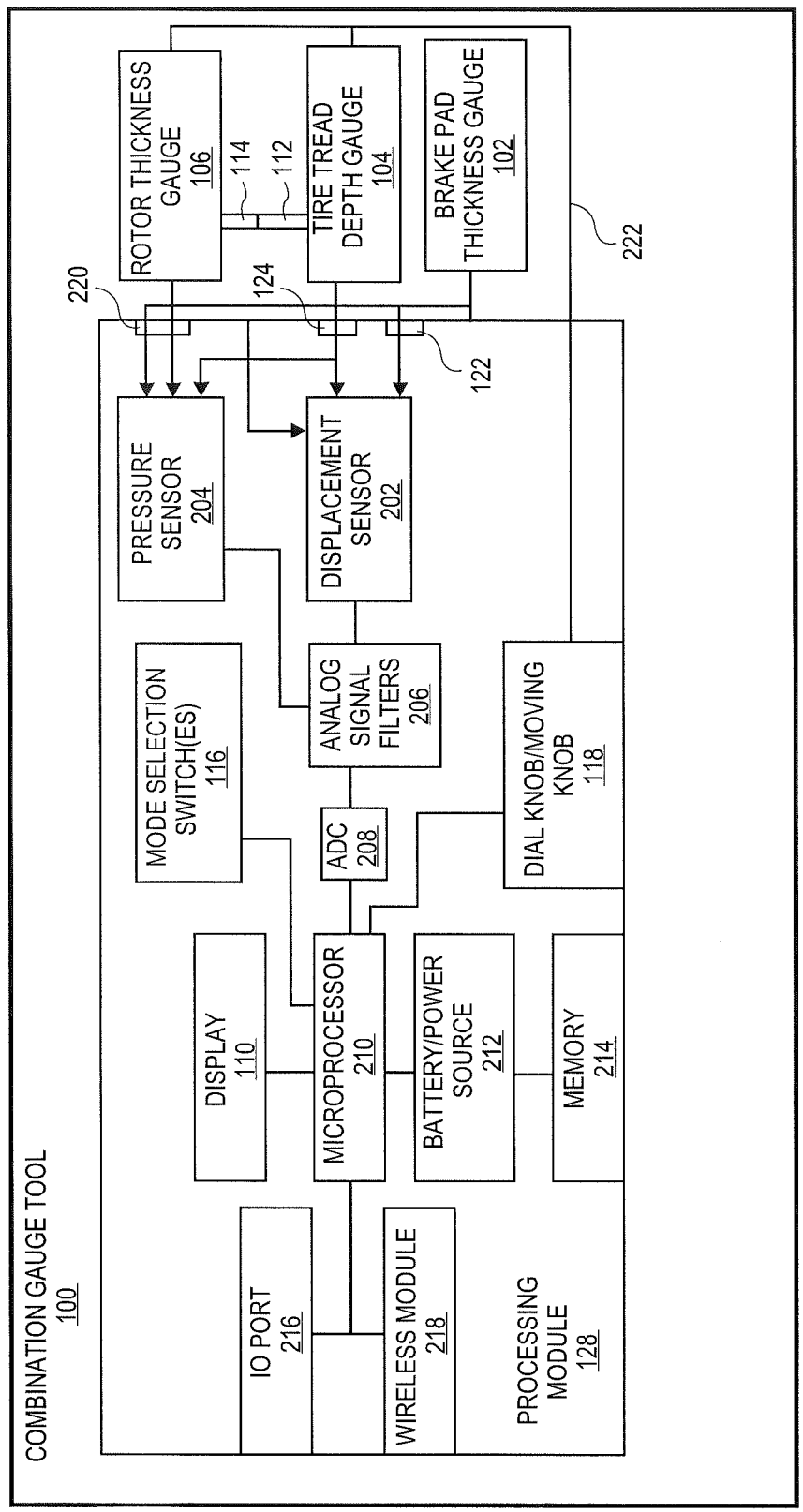
FIG. 2 is a partly schematic and partly functional block diagram of the combination gauge tool of FIG. 1, in accordance with an embodiment of the present disclosure.

The brake pad thickness gauge 102 may be coupled to the processing module 128 at a first port 122. Likewise, the tire treads depth gauge 104 may be coupled to the processing module 128 at a second port 124. The rotor thickness gauge 106 may couple to the processing module 128 via the tire treads depth gauge 104, as illustrated in FIG. 1, e.g., via a pin 112 of the tire treads depth gauge 104 that couples to a pin 114 of the rotor thickness gauge 106. Alternatively, the rotor thickness gauge 106 may couple to the processing module 128 directly (not shown in FIG. 1), e.g., via a port 220 as illustrated in FIG. 2.

The brake pad thickness gauge 102 may include a flat portion 102a and a curved portion 102b. The flat portion 102a is configured to be placed on a first surface, e.g., a flat surface, of the brake pad of a vehicle. The curved portion 102b is configured to be moveable bi-directionally, using a knob 118, as indicated by arrow 102c. The curved part or portion 102b is moveable within a hollow cylindrical body 102d of the brake pad thickness gauge 102. The brake pad sits between an end 102f of the flat portion 102a and a moveable end 102e of the curved portion 102b. A distance between the end 102f of the flat portion 102a and the moveable end 102e of the curved portion 102b is determinative of a thickness of the brake pad. Such thickness is digitally displayed on a digital display 110 (interchangeably referred to as an electronic display 110) of processing module 128 discussed below. The digital display 110 may display the measured value as a numerical value 110a, although the digital display 110 may display other or additional values, units, graphical icons, etc. Since usage of the brake pad thickness gauge 102 is known to one of ordinary skill in the art, it will not be described in further detail herein.

The tire treads depth gauge 104 may have two flat portions 112b and 112c that are placed on an edge of a tire treads, e.g., vertically or perpendicularly to a surface of the tire. Thereafter, the pin 112 is movable bi-directionally, using the knob 118, as shown by arrow 112a to measure the depth of the treads. Such measured depth is then digitally displayed on the digital display 110, e.g., as the numerical value 110a that varies from measurement to measurement and between different measurement types. Additionally or optionally, the flat portion 112c of the tire treads depth gauge 104 may include a hole 120 for hanging the combination gauge tool 100 on a wall or elsewhere.

The rotor thickness gauge 106 is moveable bi-directionally, using the knob 118 or otherwise, as indicated by arrow 106a. A rotor of a vehicle or motor may sit in a gap 108. The size of the gap 108 may be adjusted by moving the rotor thickness gauge 106 based upon the thickness of the rotor. Such thickness communicated to the processing module 128, via the second port 124 or the port 220, may then be digitally displayed on the digital display 110 as the numerical value 110a.

The processing module 128 may include, in addition to the digital display 110 and the knob 118, along with one or more mode selection switches 116. The knob 118 is coupled to the curved portion 102b of brake pad thickness gauge 102 and to the pin 112 of the tire treads depth gauge 104 to adjust positions thereof. Alternatively or additionally, the knob 118 may be coupled to the pin 114 of the rotor thickness gauge 106. In one embodiment, the knob 118 may be a linear slider, a spring-loaded switch, or the like, instead of the rotatory shape illustrated in FIG. 1.

The mode selection switches 116 may be pressed by a user of the combination gauge tool 100 to select one of the brake pad thickness gauge 102, the tire treads depth gauge 104, and the rotor thickness gauge 106 that carry out their respective measurements. Accordingly, the mode selection switches 116 may be used to adjust the digital display 110, for example, to show appropriate units of the thicknesses measured.

Referring now to FIG. 2, internal details of the processing module 128 of the combination gauge tool 100 will be discussed using a partly schematic and partly functional block diagram. In FIG. 2, elements shown in FIG. 1 are referred to by the same element numbers as in FIG. 1. Further, the combination gauge tool 100 may include additional components, e.g., an outside cover, a dock to charge the combination gauge tool 100, an attachment to hang from a key-ring or other hanging devices, etc. The blocks shown in FIG. 2 may be combined, further split or removed based on specific functionality and usage of the combination gauge tool 100, as may be contemplated by one of ordinary skill in the art after reading this disclosure. As illustrated in FIG. 2, the processing module 128 receives input from the brake pad thickness gauge 102, the tire treads depth gauge 104, and the rotor thickness gauge 106. In one embodiment, the rotor thickness gauge 106 may directly provide measurements regarding a vehicle's rotor thickness to the processing module 128 at the port 220. Alternatively, as discussed, the rotor thickness gauge 106 may provide such a measurement indirectly to the processing module 128 via the pin 114 coupled to the pin 112 of the tire treads depth gauge 104. In one embodiment, the brake pad thickness gauge 102 and/or the rotor thickness gauge 106 may be removable from the combination gauge tool 100. For example, such removal may be carried out when a tire treads depth measurement has to be performed using the pin 112 of the tire treads depth gauge 104. In one embodiment, a displacement sensor 202 may be used as a position sensor to measure a position of the pins 112 and 114 and the curved portion 102b of the brake pad thickness gauge 102. The brake pad thickness gauge 102 communicates with the displacement sensor through first port 122.

The tire treads depth gauge 104 may be coupled to the displacement sensor 202 at the second port 124. The displacement sensor 202 may be capacitive, inductive, fiber based, semiconductor laser based, combinations thereof, or other types of displacement sensors known to one of ordinary skill in the art. The displacement sensor 202 may further be coupled to a pressure sensor 204. In one embodiment, the pressure sensor 204 may be optional. The pressure sensor 204 may measure force or pressure, e.g., due to the pins 112 and/or 114 touching a surface of the vehicle part under test or diagnosis. The pressure sensor 204 may be a piezoelectric pressure sensor, strain gauge, or other types of pressure sensors known to one of ordinary skill in the art. In one embodiment, the displacement sensor 202 and the pressure sensor 204 may be integrated as a single sensor, interchangeably referred to herein as a "sensor." Such integration to a sensor may be in the form of a chip that can carry out the functionalities of both the displacement sensor 202 and the pressure sensor 204, and/or other types of sensors.

The displacement sensor 202 and the pressure sensor 204 are each coupled to one or more analog filters 206. The analog filters 206 may be active or passive filters as known to one of ordinary skill in the art. Further, the analog filters 206 may be low-pass, high-pass, band-pass, all-pass, band-stop, notch filters, switched capacitor, or combinations thereof, as known to one of ordinary skill in the art. Furthermore, the analog filters 206 may be of any order (zero, first, second, etc.) based on known filter polynomial design(s) suitable to remove noise signals from respective outputs of the displacement sensor 202 and the pressure sensor 204. For example, the analog filters 206 may be MAX263/264® series of complementary metal oxide semiconductor (CMOS) type analog filters provided by Maxim Integrated of San Jose, Calif., although other types of analog filters from other vendors may be used.

Output(s) of the analog filters 206 is connected to an analog to digital converter (ADC) 208. The ADC 208 converts the analog output of the one or more analog filters 206 into a corresponding digital signal. The ADC 208 may be AN1152® type ADC provided by Microchip Technology, Inc. of Chandler, Ariz., although other types of ADCs from other vendors may be used.

The ADC 208 is coupled to a microprocessor 210. For example, a pin on the ADC 208 may connect to a pin on the microprocessor 210's package for processing the digital output of the ADC 208. The microprocessor 210 may be a general-purpose microprocessor or a special purpose microprocessor. The microprocessor 210 may include an internal memory (not shown) for storing the digital output of the ADC 208. By way of example only and not by way of limitation, the microprocessor 210 may be an n-bit microprocessor, where 'n' is an integer value, such as one of the various microprocessors provided by Intel Corporation of Santa Clara, Calif.

Microprocessor 210 is coupled to the digital display 110, a battery or a power source 212, an input-output (IO) port 216 and a wireless module 218. The digital display 110 may be an electronic display, e.g., a 7-segment display, a light emitting diode (LED) display, a touchscreen display, or other types of digital displays known to one of ordinary skill in the art. The digital display 110 may be programmed by the microprocessor 210 to display the numerical value 110a corresponding to one or more of the brake pad thickness, the tire treads depth thickness, or the rotor thickness when the combination gauge tool 100 is in use, or at other times (e.g., after measurements). In addition, the digit display 110 may display other values, messages, or graphical icons (e.g., battery status) such as status messages to a user of combination gauge tool 100.

The IO port 216 may be a universal serial bus (USB) port, an RS-232 port, a coaxial pin type input-output port, or other types of input-output ports known to one of ordinary skill in the art. For example, via IO port 216, the brake pad thickness, the tire treads depth thickness, and/or the rotor thickness that is measured by the combination gauge tool 100 may be transmitted over a coaxial or a USB cable to an external computer for further analysis or processing. In one embodiment, the measurements performed by the combination gauge tool 100 may be stored in an external memory (not shown) upon transmission of the measured data over a wired channel after processing by the microprocessor 210.

Likewise, microprocessor 210 may provide the processed data associated with the brake pad thickness, the tire treads depth thickness, or the rotor thickness measured by the combination gauge tool 100 to the wireless module 218. The wireless module 218 may be a Bluetooth, a WiFi™, or other type of near field communication module known to one of ordinary skill in the art. The brake pad thickness, the tire treads depth thickness, and/or the rotor thickness measured by the combination gauge tool 100 may be transmitted over a wireless channel to an external computer for further analysis or processing. In one embodiment, the measurements performed by the combination gauge tool 100 may be stored in an external memory (not shown) upon transmission of the measured data via the wireless channel after processing by the microprocessor 210.

The battery or power source 212 may be a Lithium battery, a Nickel-Cadmium battery, or other types of batteries. Alternatively, the battery or power source 212 may be an interface that receives power from an external supply (e.g., a vehicle battery or mains power supply). Although not explicitly shown, the battery or power source 212 supplies direct current (DC) power to all components of processing module 128, e.g., the displacement sensor 202, the pressure sensor 204, the analog filters 206, the ADC 208, the digital display 110, etc. In one embodiment, the battery or power source 212 is removable from the combination gauge tool 100 or is replaceable. In one embodiment, the battery or power source 212 may be a rechargeable battery. In one embodiment, the battery or power source 212 is internal to the combination gauge tool 100. Alternatively, the battery or power source 212 may be external to the combination gauge tool 100.

The combination gauge tool 100 may include a memory 214. The memory 214 may be coupled to and powered by the battery or power source 212. Alternatively, the memory 214 may be coupled to the microprocessor 210 directly. Memory 214 may store one or more measurements corresponding to the brake pad thickness, the rotor thickness, and/or the tire treads depth thickness. In addition, the memory 214 may store other variables provided by the microprocessor 210 during processing of the digital data corresponding to the brake pad thickness, the rotor thickness, and/or the tire treads depth thickness, and/or other data related to the combination gauge tool 100. In one embodiment, the memory 214 may be a non-transitory computer readable medium. By way of example only, memory 214 may be a random access memory (RAM), a read only memory (ROM), or other types of memory known to one of ordinary skill in the art.

The mode selection switches 116 may be mechanical buttons that when pressed output an electrical signal to the microprocessor 210. Such electrical signal may correspond to a type of measurement that is to be performed by the combination gauge tool 100, i.e., the brake pad thickness, the rotor thickness, and/or the tire treads depth thickness measurements. The mode selection switches 116 may be biased or powered by the battery or power source 212. Alternatively or additionally, the mode selection switches 116 may be used to program or reset the combination gauge tool prior to, during, or after such measurements. In one embodiment, one of the mode selection switches 116 may be a power switch that turns the combination gauge tool 100 on or off. Alternatively, the combination gauge tool 100 may be turned off automatically upon detection of inactivity by the microprocessor 210 and may be turned on again when the microprocessor 210 detects an output at the ADC 208 corresponding to a measurement made using the combination gauge tool 100.

In one embodiment, the knob 118 may be coupled to the microprocessor 210. Additionally, the knob 118 may be coupled to the brake pad thickness gauge 102, the tire treads depth gauge 104, and/or the rotor thickness gauge 106 by a mechanical connection 222 (e.g., a wire or an actuating mechanism). For example, via the mechanical connection 222, the knob 118 may be used to adjust a position of the curved part 102b, the pin 114 and the pin 112 during measurements by the brake pad thickness gauge 102, the tire treads depth gauge 104, and the rotor thickness gauge 106, respectively. Such adjustments may be displayed in real time on the display 110 after processing by the microprocessor 210. It is to be noted that although in FIG. 1, the knob 118 in shown as rotary dial type, other types of knobs, e.g., sliding bars, spring loaded latches, switches, or the like could be used to adjust the positions of the curved part 102b, the pin 114 and the pin 112 during measurements by the brake pad thickness gauge 102, the tire treads depth gauge 104, and the rotor thickness gauge 106, respectively.

Figure 3:
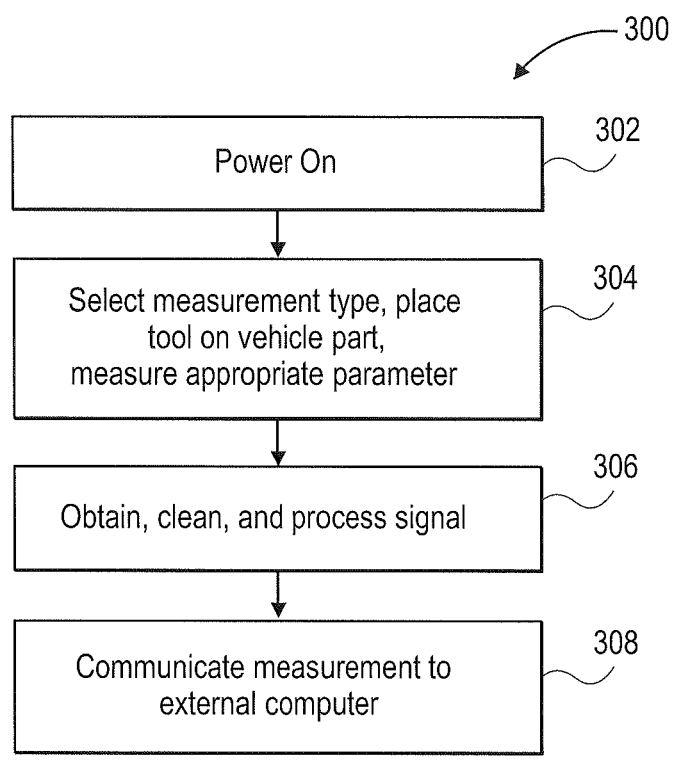
FIG. 3 is a flowchart of a method for measuring brake pad thickness, tire treads depth, and/or rotor thickness using the combination gauge tool of FIG. 1, in accordance with an embodiment of the present disclosure.

Referring to FIG. 3, a flowchart of a method 300 for measuring the brake pad thickness, the tire treads depth, and/or the rotor thickness using the combination gauge tool 100 of FIGS. 1 and 2 is discussed. It is to be noted that the operations or processes shown in the flowchart may or may not occur in a particular order, and the specific order shown in FIG. 3 is by way of example only and not by way of limitation. For example, one or more operations may be interchanged, combined, removed, or split into further sub-operations. The operations of the method 300 may be carried out sequentially or in parallel.

In an operation 302, a user or a technician operating the combination gauge tool 100 may turn on or power on the combination gauge tool 100, for example, by pressing one of the mode selection switches 116. Alternatively, the combination gauge tool 100 may be turned on by the microprocessor 210 upon detection of activity, e.g., a measurement output from the displacement sensor 202, or the ADC 208, or other components. Still alternatively, the user may turn on the combination gauge tool 100 by other mechanisms, e.g., shaking the combination gauge tool 100, or providing appropriate voice or gesture based inputs known to one of ordinary skill in the art.

In an operation 304, upon turn on of the combination gauge tool 100, the microprocessor 210 determines a mode that is selected by the user to make a measurement. Such a mode corresponds to a measurement type, i.e., brake pad thickness, tire treads depth, and/or rotor thickness. Based on which particular measurement out of these three measurements will be performed, the microprocessor 210 may update the digital display 110 to show suitable units of measurement. Alternatively, the user may press, push, or slide one of the mode selection switches 116 to indicate to the microprocessor 210 that one or more of the measurements will be performed. The appropriate one of the brake pad thickness gauge 102, the tire treads depth gauge 104 or the rotor thickness gauge 106 may be placed on respective parts of the vehicle to carry out the measurements. For example, the end 102*f* of the flat portion 102*a* of the brake pad thickness gauge 102 may be placed on an edge of the brake pad. The other edge of the brake pad may touch the moveable end 102*e* of the curved portion 102*b* of the brake pad thickness gauge 102. Using the knob 118, the user may adjust the position of the moveable end 102*e* of the curved portion 102*b* bi-directionally or unidirectionally along arrow 102*c* to firmly contact the other edge of the brake pad. The user may then press one of the mode selection switches 116 to indicate to the microprocessor 210 that the curved portion 102*b* of the brake pad thickness gauge 102 is at a final position. Upon receiving such indication, the microprocessor 210 processes the value outputted by the ADC 208 corresponding to this measurement of the brake pad thickness. For example, the final position of the curved portion 102*b* may be detected by the pressure sensor 204 as a peak pressure or reaction force on the curved portion 102*b*. When such a final position of the curved portion 102*b* is detected, the displacement sensor 202 may output an electrical signal proportional to the final position or displacement of the curved portion 102*b*. This displacement indicates the remaining brake pad thickness to the technician, and whether or not the brake pads need replacement or cleaning.

Likewise, when the user selects the tire treads depth measurement using the mode selection switches 116, the pin 112 is adjusted using the knob 118 until a lowest point in a tire treads is reached. This lowest point may be detected when the pin 112 pushes against the surface of the lowest point on the tire treads and encounters a reaction force or pressure. Such force or pressure on the pin 112 may be detected by the pressure sensor 204 that may indicate to the displacement sensor 202 that the pin 112 has reached a final position. When such a final position of the pin 112 is detected, the displacement sensor 202 may output an electrical signal proportional to the final position or displacement of the pin 112. This displacement indicates the tire treads depth to the technician, and whether or not the tire needs replacement or retreading.

Similarly, when the user selects the rotor thickness measurement using the mode selection switches 116, the combination gauge tool 100 is placed on a rotor of the vehicle such that the rotor is in the gap 108 between the tire treads depth gauge 104 and the rotor thickness gauge 106. The pin 114 is coupled to the pin 112 and the gap 108 is adjusted using the knob 118 until the rotor is firmly secured. This firm securing of the rotor in the gap 108 may be detected when a peak reaction force or pressure is detected by the pressure sensor 204 that may indicate to the displacement sensor 202 that the pin 114 has reached a final position. Alternatively, the user of the combination gauge tool 100 may press, push, or slide one of the mode selection switches 116 to indicate to the microprocessor 210 that the rotor thickness gauge 106 is firmly holding the rotor in the gap 108. When such a final position of the pin 114 is detected, the displacement sensor 202 may output an electrical signal proportional to the final position or displacement of the pin 114. This displacement indicates the remaining rotor thickness to the technician, and whether or not the rotor needs replacement, maintenance, or cleaning. In one embodiment, the brake pad thickness, the tire treads depth, and/or the rotor thickness measurements may be simultaneously carried out without removing the wheels of the vehicle for which these measurements are being made. This results in measuring the brake pad thickness, the tire treads depth, and/or the rotor thickness faster than conventional tools where the wheels have to be first removed adding to the time taken for such measurements, or separate measurement gauges or tools have to be applied.

In an operation 306, the signal output by the displacement sensor 202 and/or the pressure sensor 204 at every measurement of the brake pad thickness, the tire treads depth, and/or the rotor thickness performed in operation 304 is then cleaned by the analog filters 206. The cleaned analog signal is converted to a digital signal by the ADC 208 (e.g., in a binary format). The digital signal is communicated to the microprocessor 210 for processing. The microprocessor 210 may, for example, appropriately scale, decode, decrypt, and/or store the digital signal. Upon processing, the microprocessor 210 may program the digital display 110 to electronically/digitally display the measured value of the brake pad thickness, the tire treads depth, and/or the rotor thickness, based on which type of measurement was made.

In an operation 308, the processed digital value of the brake pad thickness, the tire treads depth, and/or the rotor thickness may be communicated to an external computer. Such communication may be carried out during or after the measurements. The combination gauge tool 100 may communicate the brake pad thickness, the tire treads depth, and/or the rotor thickness measurements using the IO port 216, the wireless module 218, and/or both. For example, the combination gauge tool 100 may be taken to a desktop computer and the brake pad thickness, the tire treads depth, and/or the rotor thickness measurements be downloaded to the computer over a USB cable coupling the combination gauge tool 100 to the computer. Alternatively, when the brake pad thickness, the tire treads depth, and/or the rotor thickness measurements are transmitted wirelessly, the user of combination gauge tool 100 may use one of the mode selection switches 116 to begin transmission of the digital data related to these measurements to the external computing device or server. The digital data may be encrypted using one or more known encryption algorithm(s) implemented by instructions executed by the microprocessor prior to communicating to the external computer. The brake pad thickness, the tire treads depth, and/or the rotor thickness measurements may then be stored in a database for future reference or analysis.

The many features and advantages of the embodiments discussed herein are apparent from the detailed specification, and thus, it is intended by the appended claims to cover all such features and advantages, which fall within the true spirit and scope of the embodiments. Further, since numerous modifications and variations will readily occur to those skilled in the art, it is not desired to limit the exact construction and operation illustrated and described, and accordingly, all suitable modifications and equivalents may be resorted to, falling within the scope of the embodiments in the present disclosure.

What is claimed is:

1. A combination gauge tool, comprising:
   a processing module including a pressure sensor and a displacement sensor; and
   at least two of a brake pad thickness gauge, a tire treads depth gauge, and a rotor thickness gauge, each of the two being coupled to the processing module at one or more inputs and configured to provide a measurement data to either the pressure sensor or the displacement sensor, wherein the at least two of the brake pad thickness gauge, the tire treads depth gauge, and the rotor thickness gauge are placeable in contact with at least one of a brake pad, a tire, and a rotor, respectively, to obtain the measurement data.

2. The combination gauge tool of claim 1 further comprising:
   an analog filter coupled to an output of the displacement sensor and the pressure sensor;
   an analog to digital converter (ADC) configured to receive an output of the analog filter for digital conversion; and
   a processor coupled to the ADC and configured to process the measurement data.

3. The combination gauge tool of claim 1, wherein the processing module further comprises:
   a mode select switch configured to allow a user to select one of the brake pad thickness gauge, the tire treads depth gauge, and the rotor thickness gauge to provide the measurement data.

4. The combination gauge tool of claim 3, wherein the processing module further comprises:
   a knob selectably coupled to the brake pad thickness gauge, the tire treads depth gauge, and the rotor thickness gauge to adjust a position or a displacement of a component of the brake pad thickness gauge, the tire treads depth gauge, and the rotor thickness gauge.

5. The combination gauge tool of claim 2 further comprising:
   a digital display coupled to the ADC, wherein the measurement data is electronically displayed on the digital display after digital conversion by the ADC.

6. The combination gauge tool of claim 2 further comprising:
   a battery or a power source configured to provide power to the ADC.

7. The combination gauge tool of claim 2 further comprising:
   a wireless module configured to transmit the processed measurement data to an external computing device; and
   a memory coupled to the processor and configured to store the measurement data.

8. The combination gauge tool of claim 1, wherein the rotor thickness gauge or the brake pad thickness gauge is removable from the combination gauge tool.

9. The combination gauge tool of claim 1, wherein the displacement sensor is communicably coupled to the pressure sensor.

10. A method of measuring using a combination gauge tool, the method comprising:
    receiving a selection of a measurement tool from one of one of a brake pad thickness gauge, a tire treads depth gauge, and a rotor thickness gauge using a mode selection switch of the combination gauge tool;
    detecting a placement of the selected measurement tool in contact with a component of a vehicle;
    measuring a measurement value using the selected measurement tool in contact with the component of the vehicle;
    determining the measurement value with a pressure sensor or a displacement sensor that is coupled to the selected measurement tool; and
    digitally displaying the measurement value on an electronic display of the combination gauge tool.

11. The method of claim 10 further comprising:
    converting an output of the pressure sensor or the displacement sensor into a digital format using an analog to digital converter (ADC) coupled to the pressure sensor and the displacement sensor.

12. The method of claim 11 further comprising:
    filtering the output of the displacement sensor or the pressure sensor using an analog filter prior to providing the output to the ADC; and
    processing a digital output of the ADC using a microprocessor coupled to the ADC.

13. The method of claim 10 further comprising:
    powering the combination gauge tool with an internal battery or a power source.

14. The method of claim 10 further comprising:
    communicating the measurement value wirelessly, with a wireless module, to an external computing device.

15. The method of claim 10, wherein the measuring further comprises:
    adjusting a position of a component of the selected measurement tool with a knob that is coupled to the selected measurement tool.

16. The method of claim 10, wherein the measuring further comprises:
    receiving a rotor between the rotor thickness gauge and the tire treads depth gauge without having to remove a tire of the vehicle.

17. A combination gauge tool, comprising:
    a brake pad thickness gauge coupled to at least one of a pressure sensor or a displacement sensor and placeable in contact with a brake pad;
    a tire treads depth gauge coupled to at least one of the pressure sensor or the displacement sensor and placeable in contact with a tire;
    a rotor thickness gauge coupled to at least one of the pressure sensor or the displacement sensor and placeable in contact with a rotor;
    a microprocessor configured to digitally process respective signals outputted by the pressure sensor or the displacement sensor; and
    a digital display coupled to the microprocessor to electronically display a measured value corresponding to the respective processed signals.

18. The combination gauge tool of claim 17 further comprising:
  an analog filter coupled to the signals outputted by the displacement sensor and the pressure sensor; and
  an analog to digital converter (ADC) configured to receive an output of the analog filter for digital conversion.

19. The combination gauge tool of claim 17 further comprising:
  a memory coupled to the microprocessor and configured to store the measured value.

20. The combination gauge tool of claim 17 further comprising:
  a wireless module configured to transmit the processed signals to an external computing device; and
  a knob selectably coupled to the brake pad thickness gauge, the tire treads depth gauge, and the rotor thickness gauge to adjust a position or a displacement of a component of the brake pad thickness gauge, the tire treads depth gauge, and the rotor thickness gauge.

* * * * *